(No Model.)

C. F. SMITH.
MACHINE FOR MAKING PREDETERMINED LENGTHS OF CHAIN.

No. 524,794. Patented Aug. 21, 1894.

WITNESSES:

INVENTOR
C. F. Smith
BY
ATTORNEY (No Model.) 8 Sheets—Sheet 3.
C. F. SMITH.
MACHINE FOR MAKING PREDETERMINED LENGTHS OF CHAIN.
No. 524,794. Patented Aug. 21, 1894.

WITNESSES:

INVENTOR
C. F. Smith
BY
ATTORNEY (No Model.) 8 Sheets—Sheet 4.

C. F. SMITH.
MACHINE FOR MAKING PREDETERMINED LENGTHS OF CHAIN.

No. 524,794. Patented Aug. 21, 1894.

WITNESSES:

INVENTOR
C. F. Smith
BY
ATTORNEY

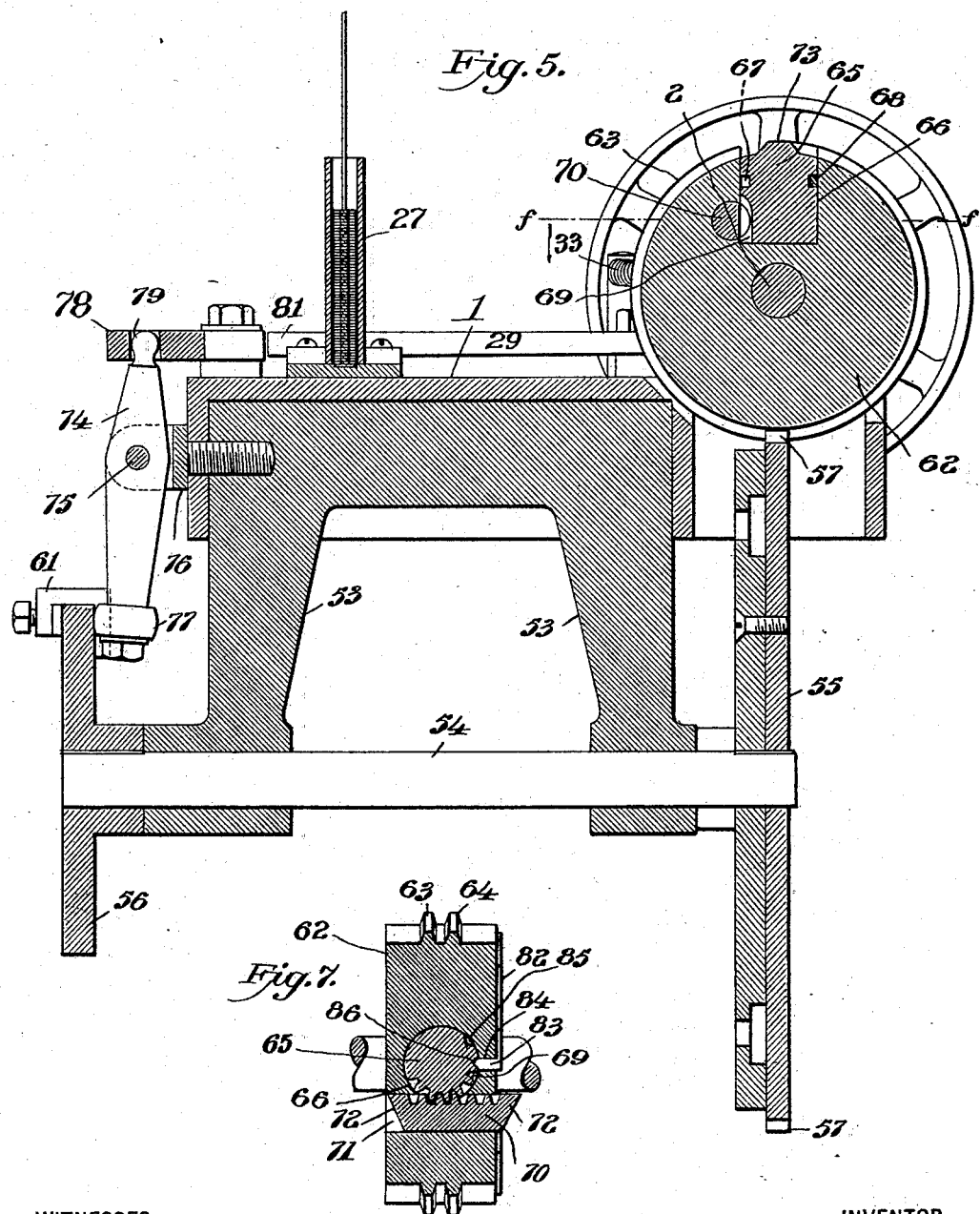

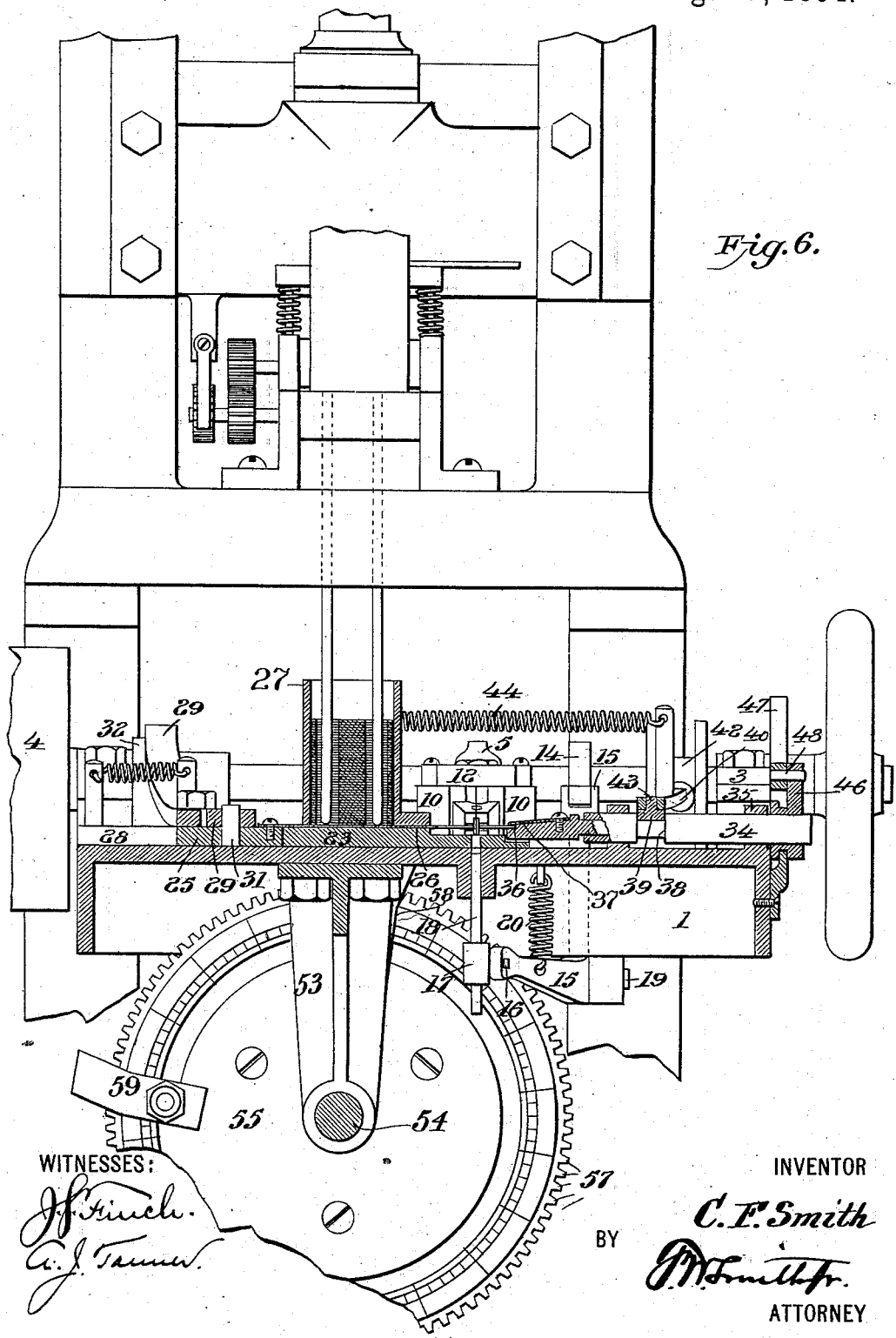

(No Model.) 8 Sheets—Sheet 7.
C. F. SMITH.
MACHINE FOR MAKING PREDETERMINED LENGTHS OF CHAIN.
No. 524,794. Patented Aug. 21, 1894.
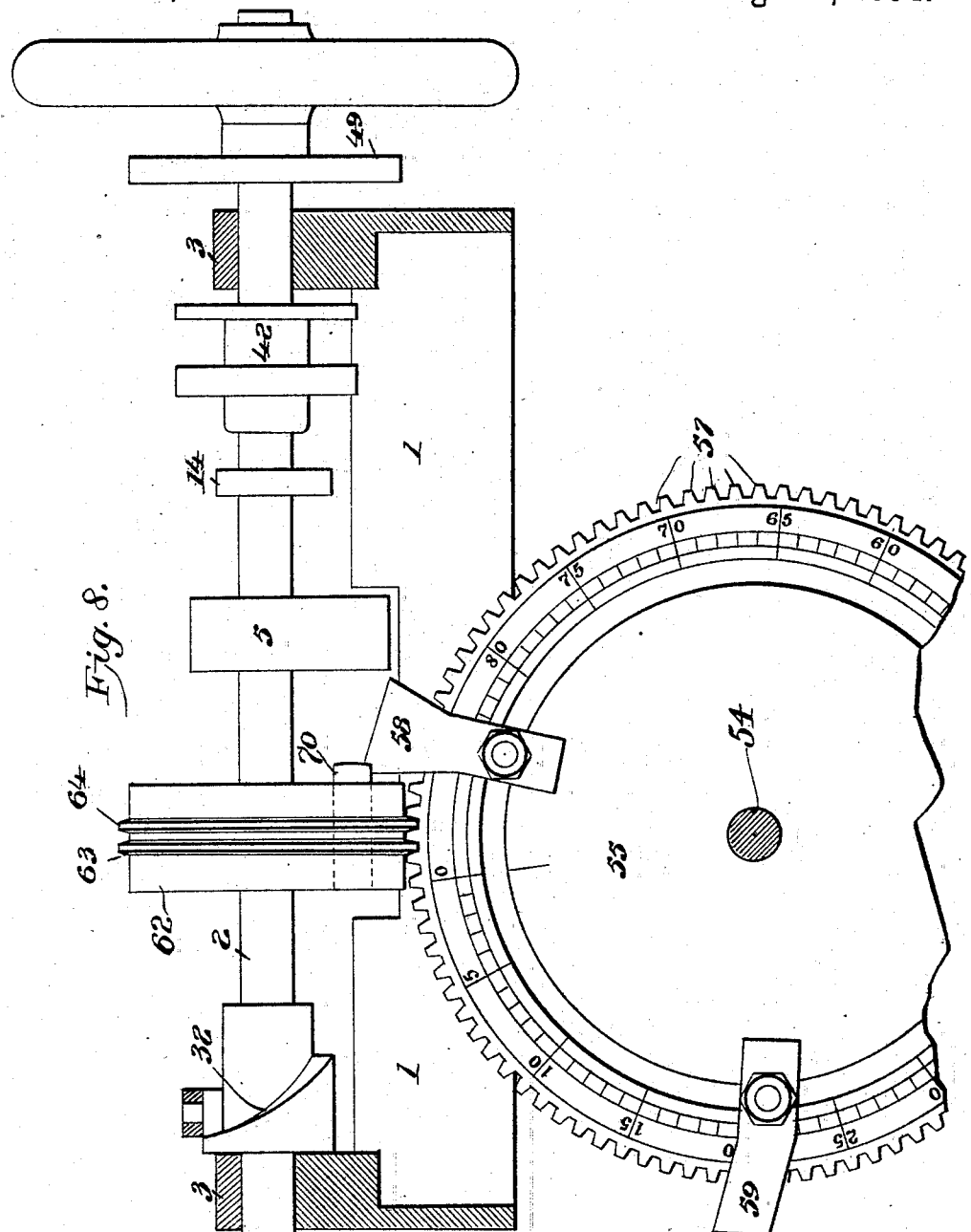
WITNESSES:
INVENTOR
C. F. Smith
BY
ATTORNEY (No Model.) 8 Sheets—Sheet 8.
C. F. SMITH.
MACHINE FOR MAKING PREDETERMINED LENGTHS OF CHAIN.
No. 524,794. Patented Aug. 21, 1894.
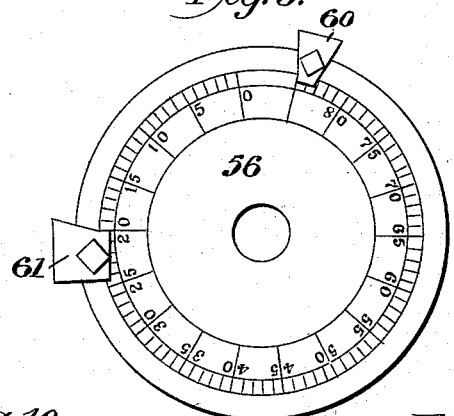
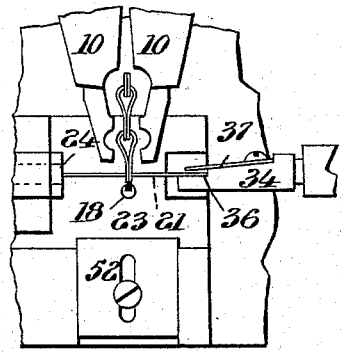
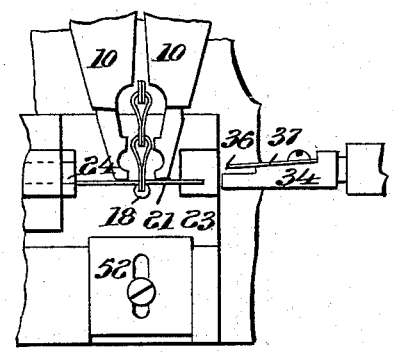
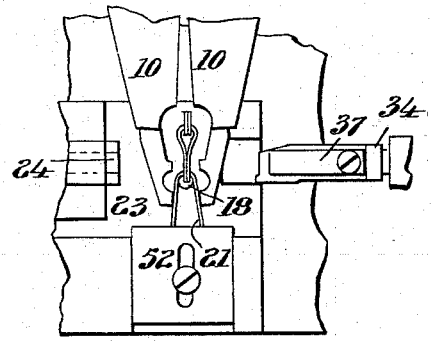
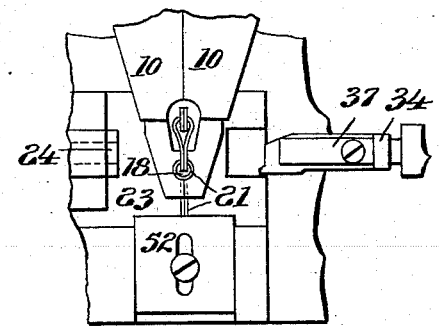
WITNESSES:
INVENTOR
C. F. Smith
BY
ATTORNEY

UNITED STATES PATENT OFFICE.

CHARLES F. SMITH, OF BRIDGEPORT, CONNECTICUT, ASSIGNOR TO THE SMITH & EGGE MANUFACTURING COMPANY, OF SAME PLACE.

MACHINE FOR MAKING PREDETERMINED LENGTHS OF CHAIN.

SPECIFICATION forming part of Letters Patent No. 524,794, dated August 21, 1894.

Application filed October 27, 1893. Serial No. 489,271. (No model.)

*To all whom it may concern:*

Be it known that I, CHARLES F. SMITH, a citizen of the United States, residing at Bridgeport, in the county of Fairfield and State of Connecticut, have invented certain new and useful Improvements in Machines for Making Predetermined Lengths of Chain; and I do hereby declare the following to be a full, clear, and exact description of the invention, such as will enable others skilled in the art to which it appertains to make and use the same.

My invention relates to certain new and useful improvements in machines for manufacturing sheet metal chain, and has for its object to provide means whereby separate chains of predetermined length may be automatically manufactured.

Figure 1:
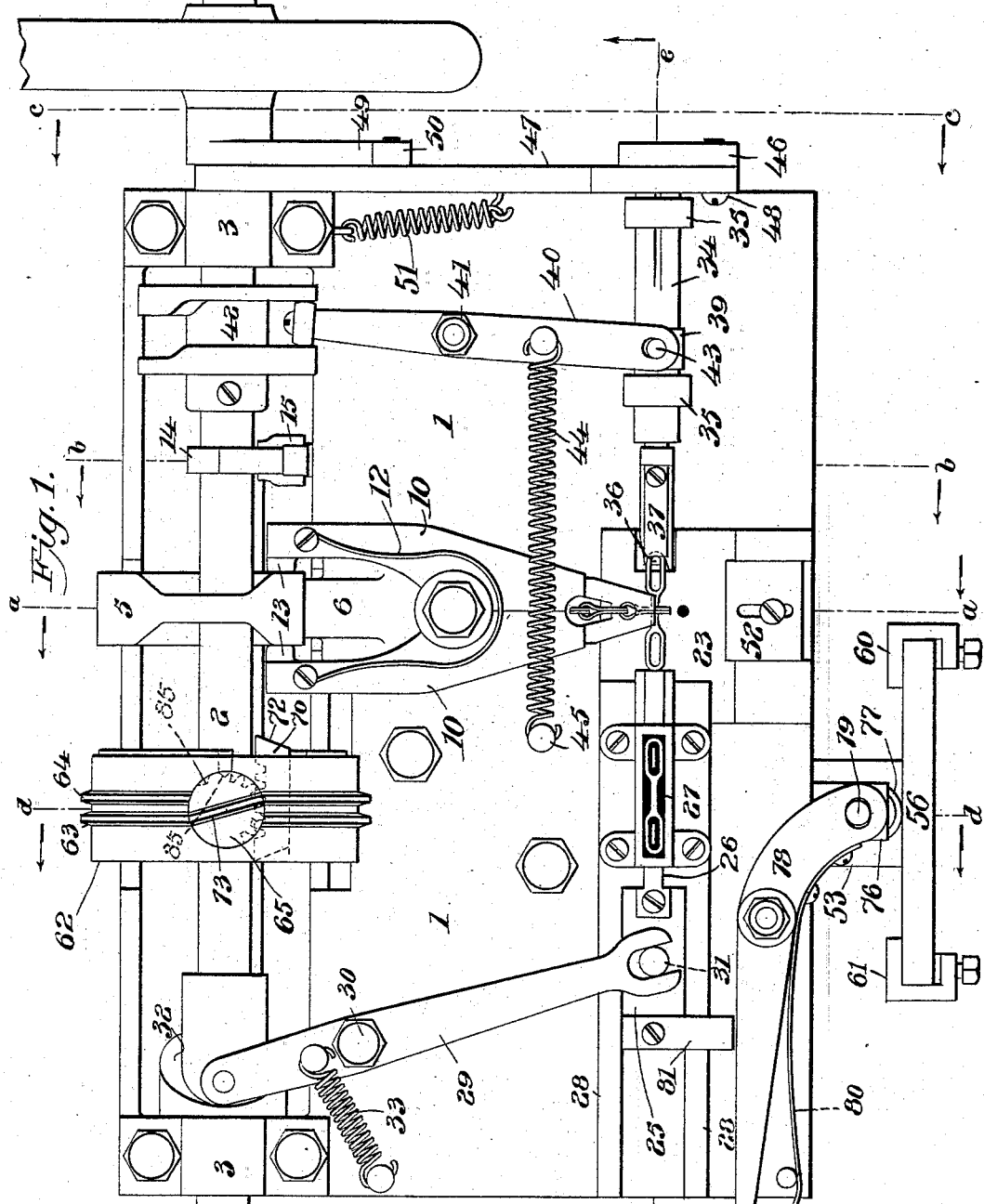
Figure 2:
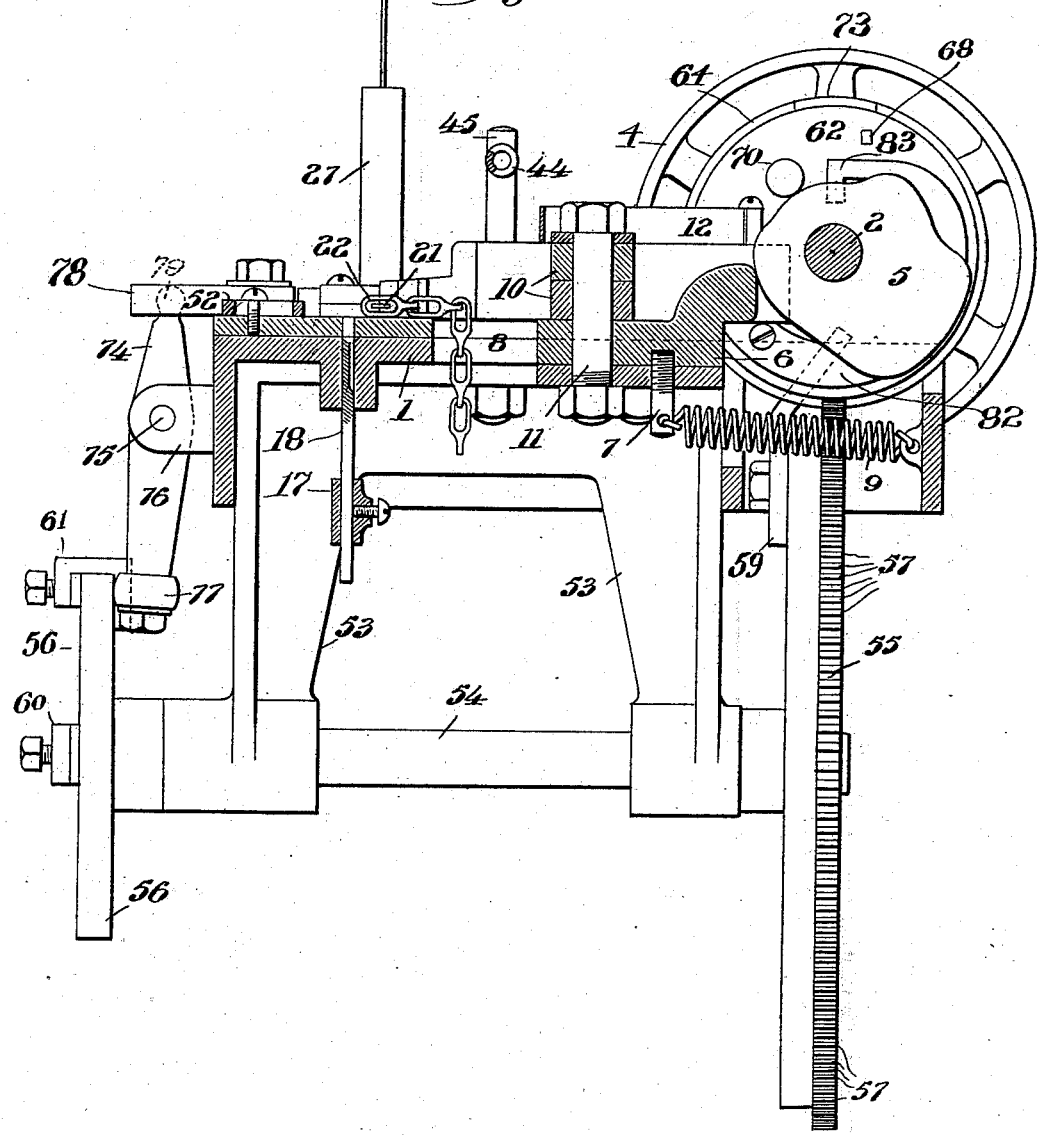
Figure 3:
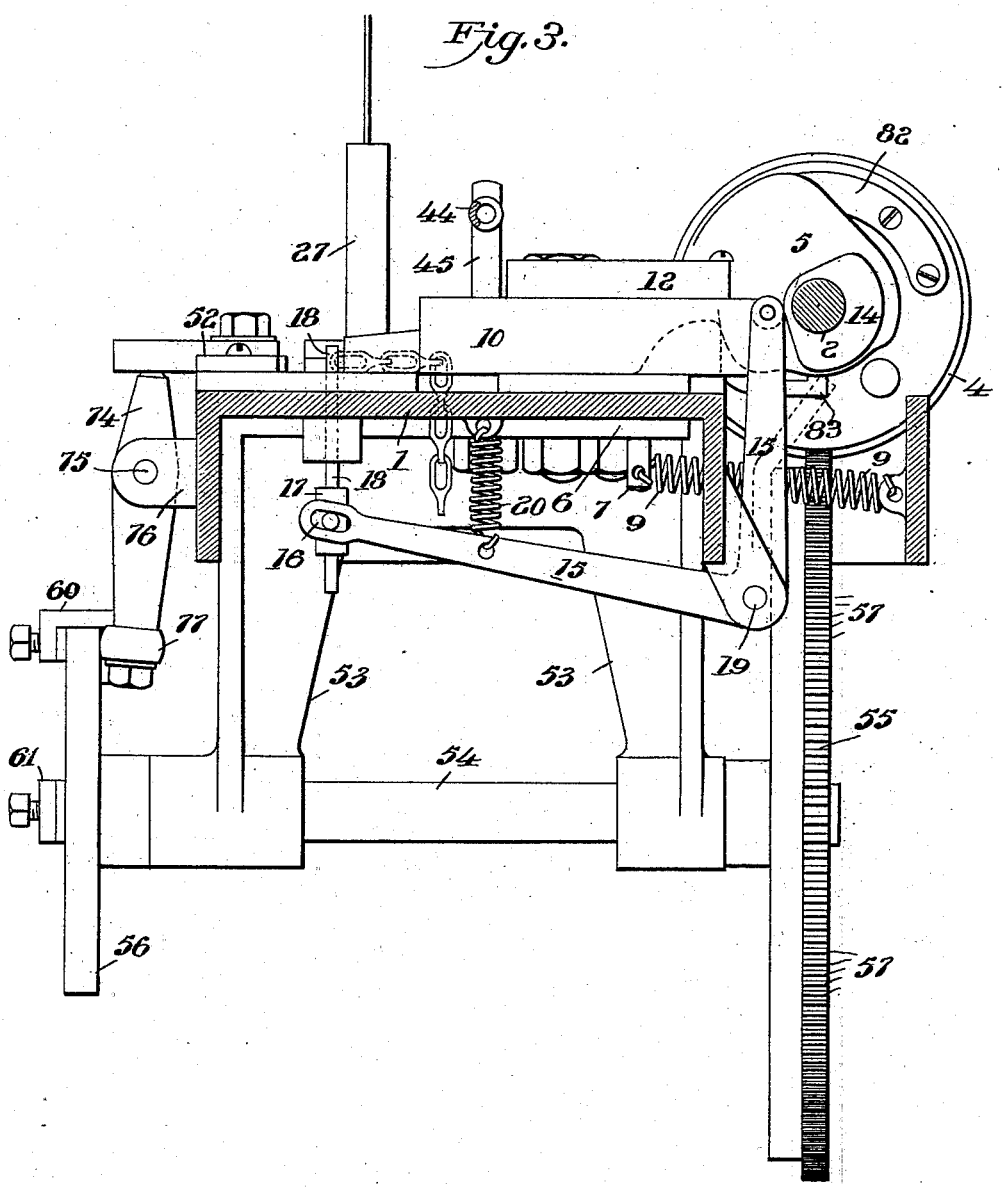
Figure 4:
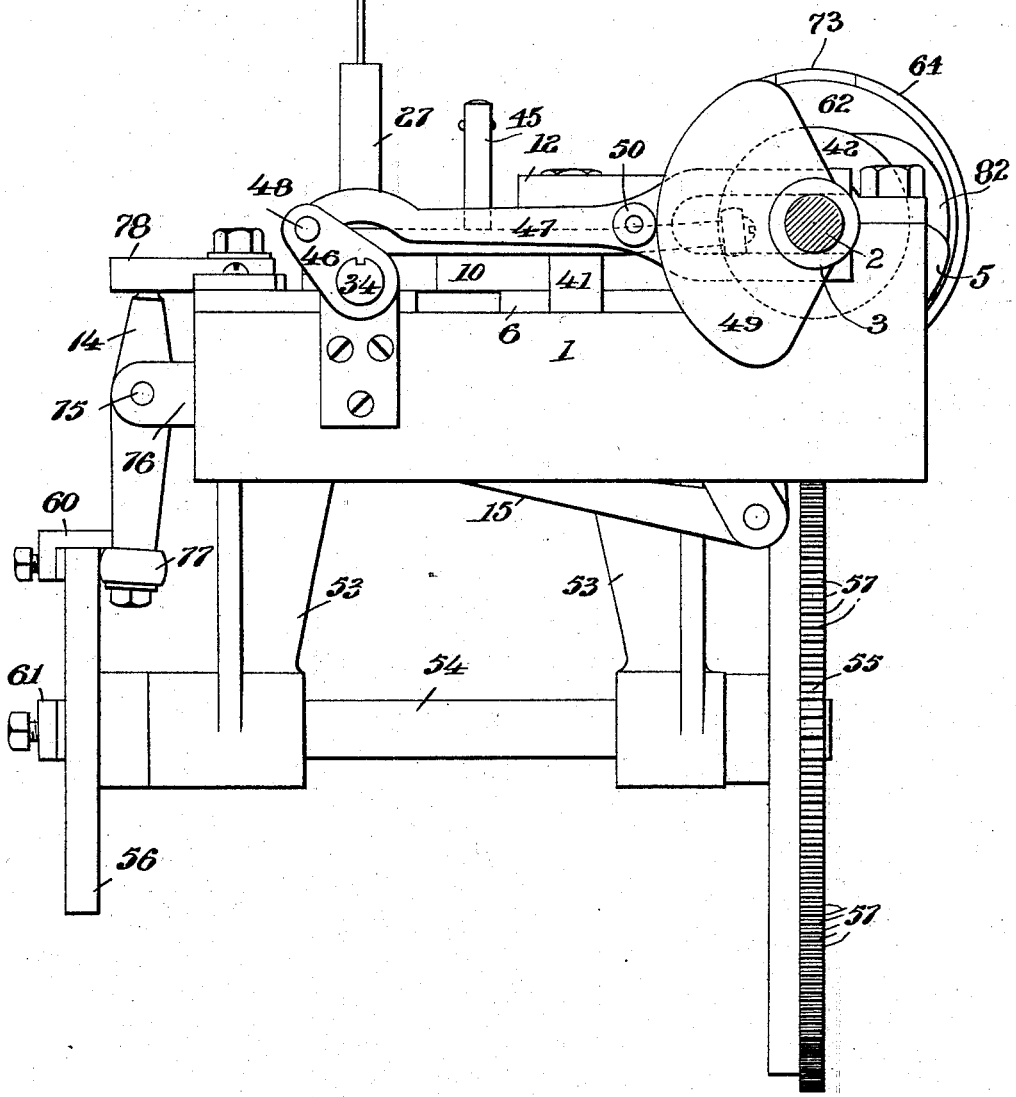

In the accompanying drawings—Figure 1 is a plan view of a machine constructed in accordance with my invention; Fig. 2 a section at the line $a$—$a$ of Fig. 1; Fig. 3 a section at the line $b$—$b$ of Fig. 1; Fig. 4 a section at the line $c$—$c$ of Fig. 1; Fig. 5 a section at the line $d$—$d$ of Fig. 1; Fig. 6 a section at the line $e$—$e$ of Fig. 1; Fig. 7 a section at the line $f$—$f$ of Fig. 5; Fig. 8 a section at the line $g$—$g$ of Fig. 1; Fig. 9 a detail elevation of the secondary stop disk, and Figs. 10, 11, 12 and 13, are detail broken plan views illustrating the successive operations of the devices for bending and shaping the blanks into the form of completed links.

Similar numbers of reference denote like parts in the several figures of the drawings.

For a better understanding of my invention I have shown a complete machine for the manufacture of sheet metal chain, but I make no claim to such machine, and moreover my improvement is not limited in its use to any particular organization of parts or mechanisms in chain making machines.

1 is the bed of the machine having at the rear a shaft 2 journaled in boxes 3, on which shaft is mounted the power pulley 4.

5 is a compound cam mounted on the shaft 2.

6 is a carriage supported on the bed and capable of a free to and fro sliding movement in a way 8.

7 is a pin which depends from the carriage, and 9 is a coil spring whose ends are secured to said pin and bed respectively, whereby the rear of the carriage is normally retracted against the face of the cam 5, as shown at Fig. 2.

10 are the clamping and forming jaws pivoted by a pin 11 on the carriage so as to be carried thereby and capable of being opened and closed. 12 is a spring secured to the jaws in such manner as to keep the forward ends thereof normally distended.

13 are studs which extend inwardly from the heel ends of the jaws against the opposite sides of the cam 5, the spring 12 also serving to keep these studs against the cam.

14 is a cam on the shaft 2, and 15 is a bell-crank one end whereof bears against said cam while the other end is loosely connected at 16 to a collar 17 which latter is secured around a pin 18 which has a free vertical play through the bed. The bell-crank is pivoted at 19 to the bed, and a spring 20 whose ends are secured to the bed and the forward leg of the bell-crank, keeps the rear end of the latter normally against the cam 14. As the cam 14 revolves, the bell-crank will be rocked on its pivotal point thereby alternately projecting the pin 18 above the level of the bed and then withdrawing it below such level. Supposing, therefore a blank 21 to be in position athwart the front ends of the jaws 10 and the pin 18 to be projected above the bed, as shown at Figs. 3 and 10, the action of the cams 5, 14, will cause the jaws to advance thereby bending the blank into U-shape around the pin, as shown at Figs. 11 and 12; the jaws will then close around the bent link thus shaping the link around the pin as shown at Fig. 13; the pin will then be withdrawn, and the jaws carrying the finished link will be retracted to normal position. The jaws are interiorly shaped to conform to a finished link, and when the latter is held by the jaws, the ends of such link will project beyond the jaws, and such ends being provided with eyes 22, it will be readily seen that a succeeding blank may be threaded through said eyes, preparatory to being bent and formed after the manner of the first mentioned link.

I will now describe the means whereby the blanks are fed successively and interlooped with the previously bent and formed links.

23 is a block secured on the bed and having a guideway 24 within which the blanks are deposited one by one.

25 is a block properly guided and capable of a to and fro movement. This block carries a push-finger 26 which fits closely within the way 24. As the finger is thrown inward it will force a blank out of the way 24 through the eyes of a previously bent and formed link, the latter being held by the jaws as previously set forth.

Mounted directly over the way 24 is a well 27 within which the flat blanks may be piled by hand one on top of the other, or said well may communicate with the dies of any ordinary blanking press such as is shown at Fig. 6, so that as fast as such blanks are blanked out they will drop into the well. When the finger 26 is retracted a blank will drop into the way 24 in position to be forced out by the next forward movement of said finger.

The block 25 is guided in ways 28, and a lever 29 pivoted to the bed at 30 is loosely connected at 31 to said block, the rear end of said lever being held in normal contact with the side of a cam 32 carried by the shaft 2 by means of a coiled spring 33 whose ends are secured respectively to said lever and the bed.

From the foregoing it will be readily understood that the combined action of the cam 32 and spring 33 will cause the lever 29 to be swung to and fro when the shaft 2 is revolved, whereby the finger 26 is reciprocated to thread successive blanks through the eyes of links that have been previously bent and shaped.

After a blank has been threaded through the eyes of a previously bent and shaped link, it becomes necessary to turn said blank from a horizontal to a vertical position so that it will lie with its flat side athwart the ends of the jaws in position for bending. This may be accomplished in various ways either by active or passive instrumentalities, but I prefer to effect the same by positive means, and I have therefore shown and will now describe such means.

34 is a rock-shaft journaled in bearings 35, rising from the bed, and having at its inner end a notch 36. This notch is formed by securing an overhanging plate 37 to the shaft 34, although such notch might be cut in the shaft itself.

38 is a countersunk annular recess in the shaft 34, and 39 is a shoe fitting therein.

40 is a lever pivoted at 41 to the bed, the heel of said lever being within the groove of a cam 42 while the front end of such lever is loosely connected at 43 to the shoe 39. A coil spring 44 secured to a post 45 rising from the bed and to the lever 40 preserves the normal or inwardly projected position of the front end of the lever, while the cam by its action throws said end backward against the resiliency of said spring. Thus it will be seen that the shaft 34 is projected and retracted by the combined action of the cam 42 and spring 44. Splined on the shaft 34 so as to have a free sliding movement thereon is a crank 46.

47 is a connecting arm whose rear end is guided around the shaft 2 so as to have a free forward and backward movement, and whose front end is pivoted to the crank 46 at 48.

49 is a cam carried by the shaft 2 and having an effective bearing against a roll 50 carried by the arm 47, the office of said cam being to throw said arm forward.

51 is a coil spring whose ends are secured to the arm 47 and to the bed, and by means of which said arm is retracted. It will thus be clear that the spring 51 and cam 49 will cause the shaft 34 to be rocked back and forth for the purpose presently explained.

When a blank is forced by the push-finger through the eyes of a previously bent link, said blank will enter and abut within the notch 36 in the rock-shaft 34. The action of the spring 51 will rock said shaft thereby bringing the blank into a vertical position preparatory to bending; the action of the cam 42 will retract said shaft, and the action of the cam 49 will cause said shaft to be rocked into normal position.

The hereinbefore described bending of the blank occurs just after the retraction of the shaft 34, while the actions of the spring 44 and the cam 49 to bring said shaft into normal position occur after the jaws 10 have been operated to bend and shape the link.

An adjustable stop 52 on the bed may be employed, against which the ends of the bent link are abutted by the action of the jaws, in order to insure the proper alignment of such ends.

The operation of my improvement organized as hereinbefore described is as follows: A blank is fed forward by the push-finger through the eyes of a previously bent link within the notch in the rock-shaft; the latter is rocked to bring the blank in a vertical plane athwart the ends of the jaws; the rock-shaft is retracted, and the jaws in distended position are forced against the blank thereby bending and inclosing the latter around the bending pin which has been previously projected above the bed; the jaws are now closed against the blank thereby shaping the latter around said pin, the latter is then withdrawn, the jaws are retracted with the link clamped thereby, the shaft is projected and rocked to normal position, a succeeding blank is fed by the push-finger through the eyes of the link last bent and shaped, the contour of the cam 5 being such that the jaws are then distended at their front ends by the action of the spring 12, and the above described operations are repeated to form succeeding links. As fast as the chain is made in completed form it drops through the slot 8 into any suitable receptacle, the weight of the chain being sufficient to drag the completed links from the jaws so that no clogging can occur. In making a continuous length of chain, the jaws always maintain their grasp on a previously bent and shaped link until a succeeding blank has been threaded through the eyes of said link, but it sometimes becomes desirable to make separate chains of predetermined lengths, and in such instance it would be necessary to release the link last completed before a succeeding blank had been threaded through the eyes of such link. I have therefore provided means whereby I can, if desired, interrupt the feeding of a predetermined blank at a predetermined time, so that when the jaws are opened preparatory to their forward movement there will be no blank in the eyes of the previously bent and shaped link to confine the chain and the latter will drop free from the machine. The means for accomplishing this result are very simple and will be obvious from the following description Depending from the bed 1 is a frame 53 within which is journaled a shaft 54 which extends in a plane at right angles to the plane of the shaft 2. On the extremities of this shaft 54 are mounted what I term the "primary stop disk" 55 and the "secondary stop disk" 56, the former disk having on its periphery gear teeth 57. On the faces of these disks are corresponding graduated scales, and secured to said faces at correspondingly similar intervals with respect to such scales are stops 58, 59, and stops 60, 61. The stops 58 and 60 are stationary, while the stops 59, and 61 are adjustable, as will be presently more fully set forth. Mounted on the shaft 2 is a hub 62 having around its periphery two raised parallel tracks 63, 64, which in cross section are constructed like gear teeth and are in engagement with the teeth 57 of the disk 55. These tracks are not continuous but are separated by a cylindrical shaped block 65 housed within a circular recess 66 in the face of the hub 62. This block is capable of turning freely within this recess and has an annular groove 67 within which projects a pin 68 which is driven through the hub 62 whereby said block is retained in position. In the circular wall of this block throughout a suitable part of its area are gear teeth 69 with which meshes a rack bar 70 which slides in an opening 71 formed through the sides of the hub. The extremities of this rack bar are beveled as seen at 72, one of which beveled portions always extends beyond the side of the hub for the purpose presently explained.

On the face of the block 65 and extending diametrically across the same is a raised track 73 corresponding in all respects to the tracks 63, 64. By turning the block 65 the track 73 is caused to bridge the space between diametrically opposite ends of the tracks 63, 64, and this result will be brought about by the back and forth movements of the rack bar 70. It will readily be seen therefore, that when the tracks 63, 64 are thus bridged, the complete revolution of the hub 62 will effect the step by step turning of the disk 55 owing to the side thrust exerted by the deflecting track 73. By turning the block so that the track 73 alternately bridges the spaces between the two pairs of diametrically opposite ends of the tracks 63, 64, the step by step movements of the disk 55 are imparted first in one direction and then in the other. These movements of the disk are governed by the stops 58, 59, which, as the disk revolves, strike the bevels first on one side and then on the other of the rack bar and thereby operate the latter to give the proper movements to the block necessary to alternately bring the track 73 into proper position with respect to the tracks 63, 64.

82 is a strong plate spring secured to the side of the hub 62 and having on its free end a detent 83 which extends through a hole 84 in said hub and engages notches 85, 86, in the block to hold the latter in the two positions to which it is carried by alternate movements of the rack bar. This effectually prevents any displacement of the block when the switch track carried thereby is performing its functions.

Referring to the secondary disk 56 and the function which it performs, 74 is a vertical lever pivoted at 75 within a bracket 76 secured to the frame of the machine, said lever having at its lower end a friction roll 77 which normally bears against the rear face of the disk 56 at a point near its periphery and within the field travel of the stops 60, 61.

78 is a pawl pivoted on the bed 1 so as to swing in a horizontal plane and having its heel end loosely connected at 79 to the upper end of the lever 74. As the disk 56 revolves in either direction, the stops 60, 61 will strike against the roll 77 carried by the lever 74 and thereby force the outer or nose end of the pawl inward against the resiliency of a spring 80 which backs the pawl in the usual manner to preserve the normal position of the same. 81 is a stop secured to the block 25 in front of which stop the nose of the pawl is thrown to interrupt the feeding of the links in the manner presently to be explained.

As before stated the cam 32 and the hub 62 are both mounted on the shaft 2, and the location of the rack bar 70 in said hub is such with respect to the layout of said cam, that as the beveled ends of said bar are on the point of being abutted against the stops 58, 59, said cam will have ceased its effective action against the lever 29 and the block 25 will be in its retracted position with the stop 81 beyond the nose of the pawl 78. The stops on the two disks, 55, 56, having a correspondingly similar arrangement, in that they inclose arcs of the same number of degrees, it will be clearly understood that when the rack bar is acted upon by one of the stops on the disk 55, a corresponding stop on the disk 56 will strike the roll 77 and thereby throw the nose of the pawl 78 immediately in front of the stop 81 on the block 25, thus effectually preventing the forward movement of said block necessary to feed a blank through the eyes of a previously bent and shaped link. As the shaft 2 continues to revolve the jaws 10 which hold a previously bent link will be distended thereby allowing said link and the finished chain connected therewith to drop from the machine.

The location of the block 65 in the hub 62 with respect to the layout of the cam 32 is such, that by the time the latter has been again brought to the position which it occupied with respect to the lever 29 immediately prior to the operation of the lever 74 to throw the nose thereof in front of the stop 81, the movement of the disks 55, 56, will have been reversed and the stop withdrawn from the roll 77, thereby permitting the pawl to be returned to its normal position away from the stop 81 by the action of its spring 80, and leaving the block 25 free to be actuated in the manner hereinbefore set forth for the purpose of feeding the link blank to the bending devices to make a new link for the chain.

The length of the chain is of course dependent upon the distance between the stops, and by adjusting the stops 59, and 61, chains of various lengths may be formed.

This attachment for making chains of given lengths may be disconnected so as to have no function whatever, by simply removing the lever 74, or by removing the stops upon either of the disks.

My improvement may be used in connection with machines other than those for making sheet metal chain, for the purpose of interrupting the continuity of the operation of any particular part or mechanism.

Having thus described my invention, what I claim as new, and desire to secure by Letters Patent, is—

1. In a machine for making sheet metal chain, the combination with the instrumentalities for making such chain, of means for automatically interrupting the interlooping of the chain links at predetermined times whereby given lengths of chain will be produced, substantially as set forth.

2. In a machine for making sheet metal chain, the combination with the feeding, bending and shaping mechanisms, of means for preventing the feeding of the blanks, thus interrupting the continuity of the chain at predetermined times whereby given lengths of chain are produced.

3. In a machine for making sheet metal chain, the combination with the feeding mechanism whereby the blanks are successively threaded through the eyes of previously bent links, of means for arresting said mechanism at certain intervals, whereby predetermined lengths of chain are made.

4. In a machine for making sheet metal chain, the combination of instrumentalities for cutting out the link blanks and depositing them in proper position preparatory to threading within the eyes of previously bent links, the reciprocatory push finger whereby said blanks are successively thrust forward through the eyes of previously bent links, and means for interrupting the function of said finger at predetermined times, substantially as set forth.

5. In a machine for making sheet metal chain, the combination of the main shaft, the mechanism for feeding the chain link blanks operatively connected with said shaft, the hub mounted on the latter and carrying the raised parallel tracks, the oscillatory block carrying the switch track, the primary and secondary stop disks mounted on a rotatory shaft, the former disk having on its periphery teeth in engagement with said parallel tracks, the stops secured to said disks at predetermined and correspondingly similar points thereof, means operated by the stops on the secondary disk for interrupting the mechanism for feeding the chain link blanks, and means operatively connected to said block and actuated by the stops on the primary disk for turning said switch track in opposite directions between the terminals of the parallel tracks, whereby the disks are revolved in opposite directions and said link blank feeding devices arrested and released at predetermined times, substantially as set forth.

6. The combination of the main-shaft, the hub mounted thereon and having around its periphery parallel broken tracks, the rotatory block within the face of said hub and carrying a switch track capable of alternately connecting the diametrically opposite terminals of said parallel tracks and having gear teeth around its body, the rack-bar in engagement with said teeth and guided within the hub, the shaft carrying the disk having teeth which are in engagement with said parallel tracks, and the stops secured to said disk at predetermined points and capable of being interposed by the rotation of said disk in the path of said rack-bar and on opposite sides of the hub, whereby as the latter revolves the rack-bar will strike said stops and be thrown first in one direction and then in the other thereby operating the switch track and effecting reverse movements of said disk, mechanism operatively connected to said main shaft for successively threading the chain links together, and means operating in harmony with said disk for interrupting said mechanism at predetermined times, substantially as set forth.

7. The combination of the main-shaft, the hub mounted thereon and having around its periphery parallel broken tracks, the oscillatory block within the face of said hub and carrying a switch track capable of alternately connecting the diametrically opposite terminals of said parallel tracks and having gear teeth around its body, the rack-bar capable of a free movement within and through said hub and engaging with the teeth on said block, the rotatory shaft carrying the primary and secondary disks the former having teeth in engagement with said parallel tracks, the stops secured to said disks at predetermined and correspondingly similar points thereof, the devices for successively feeding the link blanks, the pawl capable of being interposed in the path of such devices to arrest the function of the same, and means operatively connected to said pawl and actuated by the stops on the secondary disk, whereby, when the stops on the primary disk are interposed, by the rotation of the latter, in the path of the rack bar, the latter will strike said stops thereby throwing the switch track and reversing the movement of the primary disk, while simultaneously with the movement of said stops the stops on the secondary disk will be thrown into engagement with the means for operating said pawl thereby arresting the action of the link blank feeding devices, substantially as set forth.

8. The combination of the link blank feeding devices, the shaft carrying the means for operating the same, the hub mounted on said shaft and carrying broken parallel tracks an oscillatory block having a single track capable of connecting diametrically opposite terminals of the parallel tracks, a device carried by said hub for operating said block, the rotatory shaft carrying primary and secondary disks the former having teeth engaging with said parallel tracks, instrumentalities capable of being interposed in the path of the link feeding devices to arrest the function of the latter, and stops secured to said disks at predetermined and correspondingly similar points thereof for simultaneously effecting the operation of said device and instrumentalities, substantially as set forth.

In testimony whereof I affix my signature in presence of two witnesses.

CHARLES F. SMITH.

Witnesses:
R. H. BRODERICK,
E. D. HINMAN.